Oct. 23, 1956   L. J. M. GAMET   2,767,994
CHUCKS
Filed July 26, 1954   2 Sheets-Sheet 1
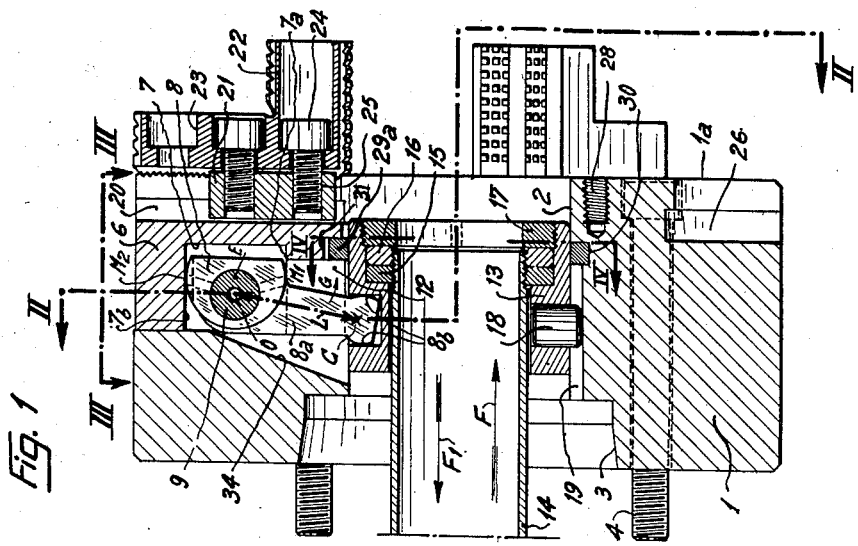
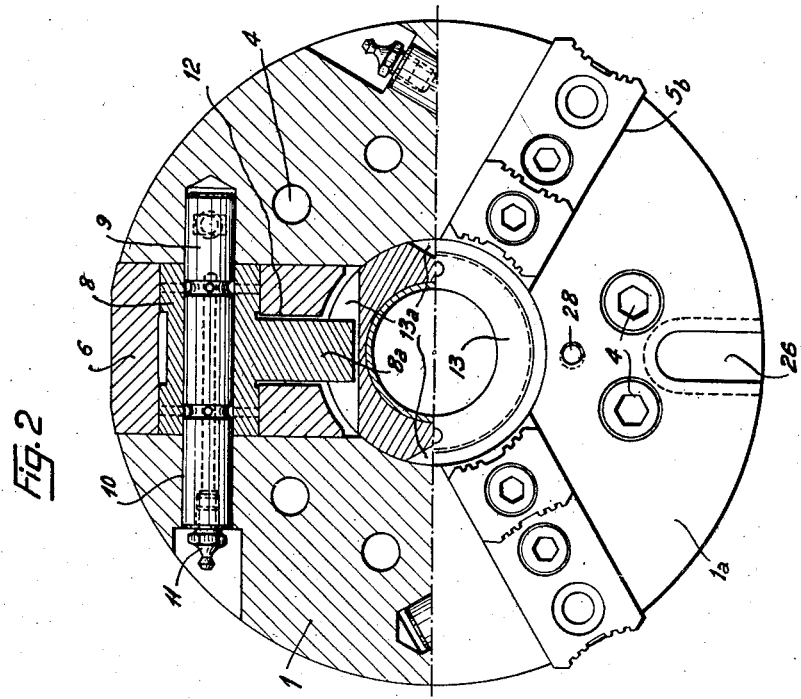

Oct. 23, 1956 L. J. M. GAMET 2,767,994
CHUCKS
Filed July 26, 1954 2 Sheets-Sheet 2
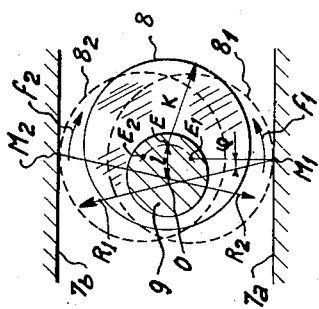
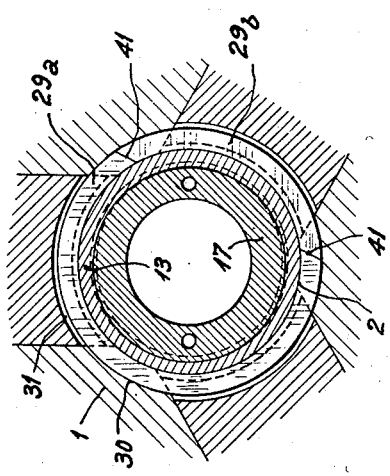
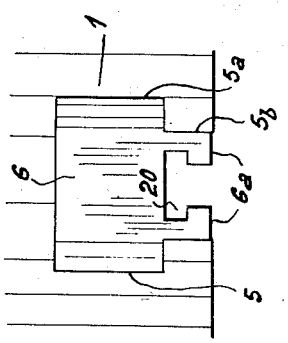
Inventor
Louis J. M. Gamet
by
Stevens, Davis, Miller & Mosher
his attorneys

United States Patent Office 2,767,994
Patented Oct. 23, 1956

2,767,994

CHUCKS

Louis J. M. Gamet, Bougival, France, assignor to La Precision Industrielle (Société Anonyme), Rueil-Malmaison, France, a French company Application July 26, 1954, Serial No. 445,589

5 Claims. (Cl. 279—119)

My invention relates to an improved rotary chuck for a machine tool, of the kind in which the jaws of the chuck are displaced by essentially radial cranked levers actuated by means adapted to slide axially in the said chuck, in such manner that the chuck may be operated during its rotation.

Chucks of this kind are well known. However, experience has shown that these known chucks do not permit of a powerful gripping action being obtained, and their use is dangerous since, if the sliding means accidentally cease to act on the levers, the work-piece machined is no longer held in the chuck and may fall out of the latter.

One object of my invention is to obtain a chuck which enables a much greater gripping pressure to be obtained than in the case of known chucks of this kind.

A further object of my invention is to produce a chuck which can remain tight, even when the axially sliding means in the body of the chuck no longer act on the levers. There is thus obtained a considerable safety in the use of chucks which can be operated whilst running.

A further object of my invention is to produce a chuck provided axially with a free bore enabling the passage of bars through the spindle of the machine, but nevertheless provided with sealing members adequate to retain internally a sufficient quantity of lubricant for all its internal members to be abundantly lubricated internally so as to reduce the frictional effects.

These and other objects, the advantages and characteristic details of my invention will be more readily understood by reference to the detailed description which follows, of the attached drawings in which:

Fig. 1 is an axial cross-section of a chuck in accordance with the invention.

Fig. 2 is a cross-section along the lines II—II of Fig. 1.

Fig. 3 is a view along the lines III—III of Fig. 1.

Fig. 4 is a section through IV—IV of Fig. 1, and

Fig. 5 is a diagrammatic illustration of the action of the eccentric cams.

The chuck shown in these figures comprises a cylindrical body 1 made of one single piece, and in which is formed an axial bore 2. The rear face of this body comprises a cone 3 for mounting on the shaft-end of the spindle of a machine tool, the fixing of the chuck on this spindle being effected by the screws 4.

In the body 1 there are milled three radial openings in the general shape of a T (Fig. 3), that is to say comprising in cross-section a rectangular portion 5a which communicates with the front face of the chuck through a narrower slot 5b. In these milled slots are housed the three jaw-holders 6. Each of these jaw-holders is provided on its rear face with a cavity 7 comprising tangential faces 7a and 7b in which is housed an eccentric cam 8 having the shape of part of a cylinder and pivoting around a shaft 9. Each of these shafts 9 is fitted into a drilled hole 10 bored in a tangential direction in the body 1, and is provided with a lubricating arrangement 11 for lubricating the bearing of the eccentric cam 8. Each eccentric cam 8 is extended by a tail portion 8a which forms a lever arm for the rotary actuation of this cam, the tail being movable in a groove 12 formed in that part of the jaw-holder 6 which is turned towards the axis of the chuck. The extremity of each tail 8a, which terminates in the cylindrical portions 8b having an axis C, is engaged in a tangential rectilinear groove 13a formed in a socket 13 carried by the tube 14, the latter being arranged axially in the chuck.

In known manner, the tube 14 is adapted to be moved in an axial direction inside the body of the chuck by means not shown, but which are well known in the art of machine tool construction.

The socket 13 is fixed on the tube 14 by means of the circular nut and its locking nut 15 and 16 which screw on to the extremity of this tube 14, and by an externally-threaded circular nut 17 which screws into the extremity of this socket.

The position of the socket may thus be regulated with respect to the tube 14, whilst at the same time it may be rigidly fixed to the tube for both directions of possible displacement of this latter.

The tube and the socket are prevented from rotating with respect to the body of the chuck by a finger 18, which is partly engaged in a radial hole drilled in this socket and partly in a groove 19 having an axial direction and which is formed in the body of the chuck.

As can be seen in Fig. 3, each jaw-holder 6, which has a cross-section generally in the shape of a T, so as to adapt it to the shape of the radial milled slots 5, comprises a T-shaped groove 20, in which slides a member 21 which is employed for fixing a jaw 22. To this end, the front portions 6a of the jaw-holder are formed with a series of fine grooves and the jaw 22 comprises openings 23 for the passage of the screws 24 which engage in the threaded holes 25 provided in the members 21. The parts 6a of the jaw-holders are sunk with respect to the front face 1a of the body of the chuck in such manner that this front face can be used as a face-plate for the fixation of a work-piece to be machined.

To this end, notches 26 of T-shaped section and having a radial direction, are provided in the spaces between the jaw-holders to receive the fixing members necessary for the use of the chuck as a face-plate.

Other bored holes 28 may also be provided in the front face 1a for the fixing of auxiliary members on the chuck.

The internal cavities of the chuck (which are closed in at the rear by the fitting of the chuck on the shaft-end of the spindle and near the periphery by the jaw-holders 6 themselves) are closed at the front by a ring which is formed in two parts 29a and 29b (Fig. 4) applied against the periphery of the socket 13, and is housed in three grooved segments 30 formed in the body of the chuck and in three grooved segments 31 formed in each of the jaw-holders 6.

Before mounting the jaw-holders in their milled housings and before assembly of the socket 13, the portion 29a (the largest part) of the ring is put in position through the front face of the chuck in the grooved segments 30, making use of the passage formed by the openings 5. Then in the same manner, the portion 29b is placed in position, thus completing the portion 29a and finally the ring 29a, 29b is turned in the grooves 30 until the two connecting extremities 41 between the parts 29a and 29b are located in two grooved segments 30.

In this way, the part 29a, the development of which is greater than 120 degrees, can grip the periphery of the socket 13, 29 by virtue of its elasticity, and thus prevents the greater part of the leakages of oil along this socket;

the part 29b completes the oil-tightness along the length of the socket 13. In addition, the faces of the parts 29a and 29b, applied against the walls of the grooved segments 30 and 31 prevent a leakage of oil along the internal bore of the chuck and along the internal edges of the jaw-holders. Finally, since the extremities 41 are located in the grooved segments 30, the leakage of oil through these cuts is very small. A large quantity of oil may thus be contained within the interior of the chuck so as to reduce the friction, particularly in the contact between the cylindrical portions 8b and the grooves 13a.

The operation of the chuck which has just been described above is as follows:

Starting from the mean position of the jaw-holders shown in Fig. 1, an effort exerted in the direction of the arrow F on the tube 14 effects rotation of the eccentric cams 8, by means of the tails 8a in the direction of the arrow G and, due to the action of these cams, the jaw-holders are displaced outwards from the axis of the chuck.

It can easily be seen that a pull in the opposite direction (arrow F1) on the tube 14, causes on the other hand, a closing-in movement of the jaw-holders 6. The force exerted by the cams on the jaw-holders is applied along the generators of contact M1 or M2 of the eccentric with the tangential faces 7a or 7b of the cavities 7 provided in the jaw-holders. The directions of these thrusts are located approximately in the central plane of the rectangular portion 5a of the openings 5, so that the jaw-holders are displaced by an effort parallel to their guides and located roughly in the axis of the guides and thus the jaw-holders are not subjected to any torsional forces and, in consequence, their friction against the guide-faces of the openings 5 is reduced.

In addition, this friction is also reduced due to the fact that the contour of the cross-section of the milled guiding slots 5 is essentially of rectangular shape, in fact almost square, which means that it has as small a perimeter as possible.

Finally, for a given effort applied to the tube 14, the effort transmitted to the jaw-holders 6 depends on the leverage effect of the eccentric, that is to say on the ratio of the distance from the point O to the perpendicular at M1 or M2 to the faces 7a and 7b of the cavity 7, to the distance L from this same point O to the axis C of the cylindrical portions 8b. In the most unfavourable case, that is when the jaw-holders 6 are in their mean position, the first distance is equal to $l$ which is to say, to the eccentricity (OE) of the eccentric 8; in all other cases, this distance is less than $l$. As the ratio $$\frac{L}{l}$$

is approximately equal to 8, the force exerted on the three jaw-holders at the same time is always more than eight times greater than the force applied to the tube 14.

By virtue of the location of the force exerted on the jaw-holders, of the reduction effected in all the frictions and especially the friction of the jaw-holders in their guides, and of the magnification of the force by the leverage effect, it is possible to obtain gripping forces on the jaws amounting to several tons.

These large gripping forces enable the hard jaws 22 (in tempered steel) provided with teeth, to be replaced by soft jaws, that is to say by jaws of non-tempered steel and which have no teeth, being machined exactly to the dimension of the pieces to be held.

Starting from the mean position shown in Fig. 1, each of the eccentrics 8 can pivot on one side until the edge of the tail 8a comes up against the bottom of the corresponding notch 34 formed in the body 1, and to the other side until the tail 8a comes up against the ring 29a, 29b. In Fig. 5, the eccentric 8 may also pass from its means position, either towards one of the extreme positions $8_1$, or towards the other extreme position $8_2$. If it is supposed that, to grip a work-piece between the jaws by its exterior, the eccentric having been brought into the position $8_1$, that is to say the eccentric is in contact at M1 with the face 7a of the cavity 7; if, having gripped the work-piece in the jaws by action on the tube 14, the tractive force applied to this tube is removed, the reaction of the gripping force at the point M1 tends to cause the eccentric to rotate in the direction of the arrow $f_1$, that is to say in the slackening-off direction for the chuck. However, the eccentric does not roll on the face 7a but has a sliding contact with that face. The supporting reaction at the point M1 as soon as this sliding action starts, is thus not directed along the line M1, E1, but along R1, the angle $\varphi$ being equal to the angle of friction of the surface of the eccentric against the surface 7a. It is known that this friction angle for two lubricated metal surfaces is of the order of 12 to 15 degrees, since the coefficient of friction tan $\varphi$ is in this case approximately equal to 0.25.

In consequence, if the radius K of the eccentric 8 is more than four times greater than the eccentricity $l$ (distance OE), the reaction R1 passes in theory beyond the point O, as is shown in the figure. In actual fact, this reaction passes through the point O, even if the friction is very high, since if the reaction R1 passed beyond the point O, it would become an active gripping force and this is not possible.

Thus, the eccentric 8 cannot turn and the chuck remains tight, even when the force acting on the tube 14 is removed. In order to slacken-off the chuck, it is necessary to apply a positive force in the direction of the arrow F to this tube.

In the same way, it can be seen that, in the case of gripping from the exterior (the eccentric being pressed against the point M2 on the face 7b), this eccentric tends to rotate under the supporting reaction in the sense of the arrow $f_2$, and in consequence, the support reaction at the point M2 is R2. Thus in all the gripping positions, the eccentric is wedged against the jaw-holder.

By reason of the strong pressure applied at the support points M1 or M2, the oil or the grease is practically expelled from the space between the surface in contact and, in practice, the coefficient of friction is greater than 0.25. In addition, in order to prevent slackening-off, it is sufficient that the support reactions R1 or R2 should come fairly close to the point O. In consequence, it suffices in practice that K should be about three times greater than $l$ in order that the eccentric may be wedged at the moment of gripping.

This wedging action has a very great advantage, since, in the case in which the means of acting on the tube 14 fail during working, the work-piece held in the chuck can no longer become loose inside the latter.

I claim:

1. A chuck comprising a generally cylindrical body having a channel extending axially therethrough, a prismatic radial passage adjacent a face thereof, and a bore extending across the said passage perpendicularly thereto and to the axis of the said body; a prismatic extended jaw-holder slidably accommodated in the said prismatic passage and having a cavity bounded by two opposite walls extending generally parallel to the axis of the said bore, on both sides thereof, one of the said walls being located between the said bore and the said channel and the other of the said walls being located beyond the said bore with respect to the said channel; a shaft journalled in the said bore and extending through the said cavity; an eccentric cam in the general shape of a portion of a cylinder, housed in the said cavity, in contact engagement with the said opposite walls, the said cam being adapted to pivot about the said shaft; a lever integral with the said cam and extending therefrom towards the axis of the said body; and sliding means in the said channel, axially movable with respect thereto and cooperating with the said lever so as to cause a rocking action of the said cam about the said shaft.

2. A chuck as claimed in claim 1, wherein the opposite walls of the cavity are substantially planar surfaces.

3. A chuck as claimed in claim 1, wherein the prismatic radial passage has a T-shaped cross-section with a rectangular portion leading, through a slot-like portion, to the said face of the cylindrical body.

4. A chuck as claimed in claim 1, wherein the radius of the eccentric cam in the shape of a portion of a cylinder is greater than three times the distance between the axis of the said cylinder and the axis of the shaft.

5. A chuck comprising a generally cylindrical body having a channel extending axially therethrough, three radial passages of T-shaped cross-section at 120° to each other, three bores extending across the said three passages respectively, perpendicularly thereto and to the axis of the said body, and three groove segments in the wall of the said channel, each included in the space between two radial passages; three extended jaw-holders of T-shaped cross-section slidably accommodated in the said three passages respectively, each jaw-holder having a cavity bounded by two opposite walls extending generally parallel to the axis of the corresponding bore, on both sides thereof, one of the said walls being located between the said bore and the said channel and the other of the said walls being located beyond the said bore with respect to the said channel; three shafts journalled in the said three bores respectively and extending through the corresponding cavities; three eccentric cams in the general shape of portions of cylinders, each housed in a cavity, in contact engagement with the said opposite walls, the said three cams being adapted to pivot about the said three shafts respectively; a lever integral with each of the said three cams and extending therefrom towards the axis of the said body; a socket member sliding in the said channel and cooperating with the said lever so as to cause a rocking action of the said cams about the said shafts; an annular ring portion of about 120° housed in the said groove segments and applied against the said socket; and a further annular ring portion adapted to complete the former-mentioned ring portion and housed in the said groove segments.

References Cited in the file of this patent
UNITED STATES PATENTS

| | | |
|---|---|---|
| 1,366,003 | Iggberg | Jan. 18, 1921 |
| 1,837,174 | Sloan et al. | Dec. 15, 1931 |
| 2,422,785 | Johnson | June 24, 1947 |